Dec. 25, 1951  G. V. WOODLING  2,579,529
FLARELESS TUBE CONNECTION
Filed March 1, 1949

INVENTOR.
George V. Woodling

Patented Dec. 25, 1951

2,579,529

UNITED STATES PATENT OFFICE 2,579,529

FLARELESS TUBE CONNECTION

George V. Woodling, Cleveland, Ohio

Application March 1, 1949, Serial No. 78,990

2 Claims. (Cl. 285—122)

My invention relates to couplings and more particularly to connections of the non-flare type having a contractible sleeve for engaging a cylindrical body or a tube.

This application is a continuation-in-part of my pending application, Serial No. 755,833, filed June 20, 1947, now Patent No. 2,472,872, for Flareless Tube Coupling.

An object of my invention is to provide a first sealing engagement by pressing the end of the tube into a tapered counterbore of a coupling body and a second sealing engagement by pressing a contractible sleeve between the tube and a tapered flared mouth leading outwardly toward the end of the coupling body from the tapered counterbore.

Another object of my invention is to provide, in a tube coupling of the non-flare type, a connector body having a tapered counterbore to wedgingly receive the end of the tube and a tapered flared mouth leading outwardly toward the end of the coupling body from the tapered counterbore to receive a contractible sleeve mounted around and adapted to be contracted against the tube.

Another object of my invention is to eliminate an abutment shoulder in the coupling body against which the end of the tube may abut, whereby the tube may move longitudinally with the sleeve as the sleeve contractibly engages the tube.

Another object of my invention is to prevent the sleeve from shearing or "plowing" up an annular ridge of appreciable size around the tube in advance of the leading end of the sleeve by permitting the tube to longitudinally move along with the sleeve as it contracted about the tube.

Other objects and a fuller understanding of my invention may be had by referring to the following description and claims, taken in combination with the accompanying drawing, in which:

Figure 1:
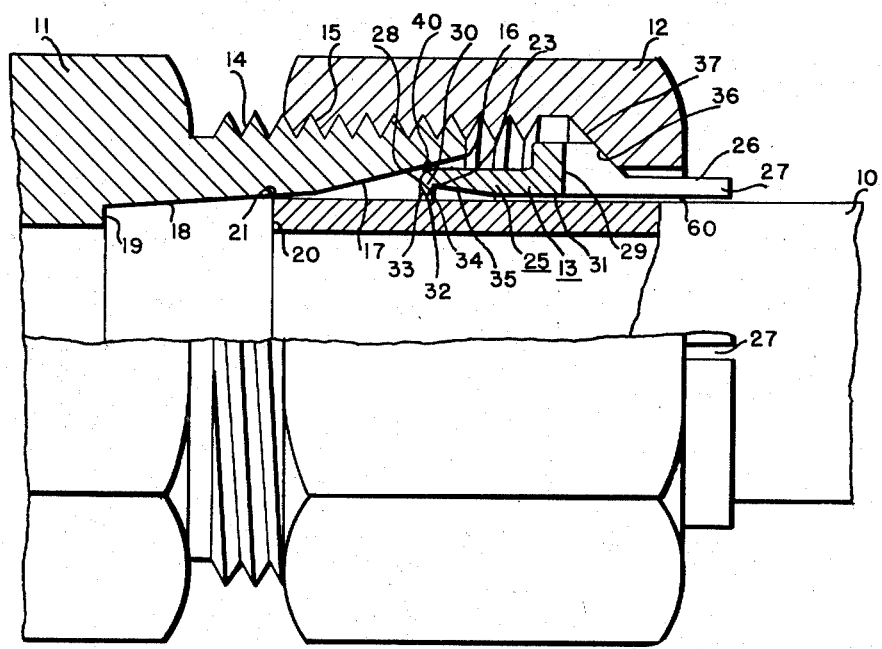
Figure 1 is an enlarged side view of a tube coupling embodying the features of my invention, the upper part being shown in section to illustrate the relationship of the parts prior to the time the nut is tightened.

With reference to Figure 1 of the drawing, my invention comprises generally a coupling body 11, a coupling nut 12, and a contractible sleeve 13 adapted to contractibly engage a tube 10.

The coupling body 11 is provided at its right-hand end with male threads 14 which are adapted to be threadably engaged by female threads 15 provided in the nut 12 for pressing the sleeve into engagement with the tube. As illustrated, the coupling body is provided with a first entrance flare 17 and a second entrance flare 18 to receive the tube. The second entrance flare 18 comprises a counterbore having an annular tapered wall section with a very small taper on the order of 1 to 5 degrees into which the end of the tube is wedgingly received to provide a tube seal with the coupling body. The first entrance flare 17 has an annular tapered wall section and extends outwardly toward the end 16 of the coupling body from the counterbore 18. The taper of the first entrance flare 17 may be on the order of 10 to 12 degrees measured with respect to the longitudinal axes of the tube.

The sleeve 13 comprises a continuous annular body 25 provided with rearwardly extending segmental fingers 26 which grip the tube when the nut 12 is tightened. The sleeve is preferably constructed of alloy steel, alloy brass or other metal capable of being treatable or hardenable throughout its mass to both a resiliency and a hardness value greater than that of the insertable tube. For a steel sleeve, I find that steel known as 4140, heat-treated throughout its entire mass and tempered to a hardness value of approximately 40 to 48 Rockwell, is satisfactory. For a brass sleeve, used principally for copper tubing, the sleeve may be made of alloy brass which has both a resiliency and a hardness value greater than that of the tube. The brass sleeve may be made of high tensile strength alloy brass, such as that manufactured by leading brass manufacturing companies.

Figure 3:
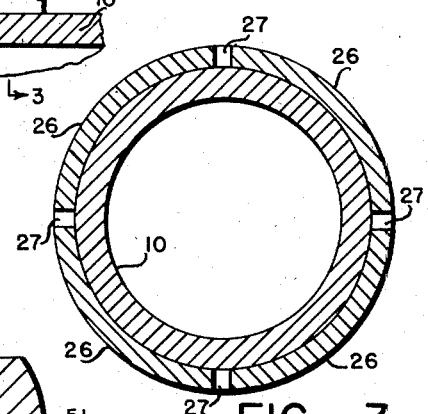
Figure 3 is a cross-sectional view taken along the line 3—3 of Figure 2, and illustrates the disposition of the rearwardly extending segmental fingers which grippingly engage the tube when the nut is tightened.

In the manufacture of the sleeve, the fingers 26 are provided by making slots 27 in the rearward section thereof at annularly spaced intervals thereabout. In Figure 3, I show four slots, but any other number may be used. The continuous annular body 25 has a first or leading end 28 and a second or rearward end 29. As illustrated, the end 29 constitutes the forward terminus for the slots 27. The leading end 28 is provided with an internal annular rib 30 which has first and second converging side walls 33 and 34 that meet to define an annular edge 32 which is adapted to be embedded into the tube when the sleeve is pressed into the first entrance flare 17 by the nut 12. The first side wall 33 constitutes a part of the first or leading end of the sleeve and merges with an outer annular cam surface 40 which constitutes the other part of the leading end of the sleeve. On the rearward side of the rib, the sleeve is provided with an internal relief bore having a longitudinally extending wall 35 which extends rearwardly from the rib 30 and merges into a cylindrical wall 31 at the rear end section of the continuous annular body. The relief bore is thus defined by the second side 34 of the rib 30 and the longitudinally extending wall 35. The intermediate part of the entire sleeve, that is, the rearward end of the continuous annular body 25 and the forward end of the segmental fingers 26 is enlarged to provide a tapered or cam shoulder 36 against which a cam shoulder 37 of the nut engages for pressing the leading end 28 of the sleeve into the first entrance flare 17 and for contracting the segmental fingers 26 about the tube.

Figure 2:
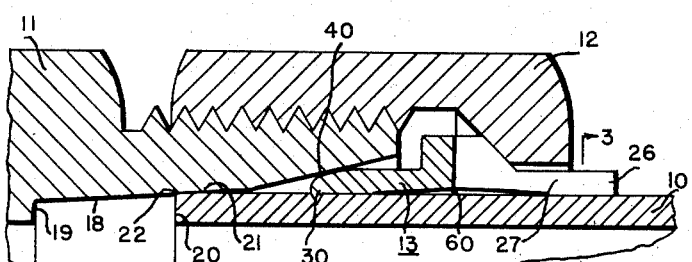
Figure 2 is a fragmentary view of Figure 1 and shows the relationship of the parts after the nut is tightened.

In operation, as the sleeve is pressed forward by the tightening of the nut, the outer annular cam surface 40 of the sleeve forcibly engages the tapered wall section of the first entrance flare and thereby produces a camming action which cams or deflects the leading end of the sleeve against the tube. The camming action embeds the rib into the tube which resists longitudinal pull of the tube from the sleeve. Inasmuch as the end of the tube wedgingly fits within the second entrance flare, which is of a very slow taper, the tube is permited to move along with the sleeve as the rib becomes embedded into the tube. Thus, the end of the tube may move from point 21 to point 22 of Figure 2 during the tightening of the nut, the point 21 being the place where the end of the tube becomes arrested when it is manually inserted therein by the operator. The second entrance flare or counterbore 18 is sufficiently long that the end 20 of the tube never abuts against the shoulder 19 of the coupling body. Since the tube may move with the sleeve, I prevent the sleeve from shearing or "plowing up" an annular ridge of appreciable size around the tube in advance of the leading end of the sleeve. When the longitudinally extending surface 35 of the relief bore engages the tube, it functions to aid in limiting the degree to which the rib may be embedded into the tube. The sleeve has a minimum or weakened wall thickness at the junction 23 where the side wall 34 of the rib and the relief bore wall 35 meet which is located next adjacent the rearward side of the rib, whereby a hinged action is produced so that the leading end of the sleeve and the rib constitute a readily contractible portion which may be cammed or deflected inwardly against the tube notwithstanding the fact that the sleeve is constructed of a hardenable alloy steel, brass or other material. The wall thickness of the sleeve, beginning at the junction 23 gradually increases as advancement is made in a rearward direction toward the cylindrical wall 31 where the wall thickness becomes a maximum. The wall thickness, as it approaches a maximum, becomes sufficiently strong as to present a substantially noncontractible portion which is disposed next adjacent to and merges with the readily contractible portion at the leading end portion of the sleeve. Both the readily contractible portion and the substantially noncontractible portion are disposed to be pressed against the internal annular cam surface of the first entrance flare 17 in the order named. As the sleeve is initially pressed into the first entrance flare 17, the readily contractible portion cams or deflects inwardly against the tube for gripping the tube against longitudinal pull from the coupling body 25. As the sleeve is further pressed into the entrance flare 17, the substantially noncontractible portion resists further inward contraction of the sleeve, the resisting action limiting the amount that the sleeve may be pressed into the entrance flare 17, and thereby producing a "hit home" feeling to the tightening of the nut. The substantially noncontractible portion of the sleeve prevents the leading end or contractible portion from collapsing or inwardly buckling the wall of the tube. As resistance to longitudinal pressing movement of the sleeve is encountered, the cam shoulder 37 of the nut presses against the cam shoulder 36 of the sleeve and contracts the segmental fingers 26 against the tube for giving support to the tube against vibration. The fingers are disposed to spring back from the tube when the nut is released or disengaged.

The engagement of the sleeve against the tube and against the entrance flare 17 provides the main seal against high fluid pressure, as distinguished from the tube or secondary seal afforded by the end of the tube wedgingly fitting into the slow tapered bore 18. Notwithstanding the fact that the tube or secondary seal may allow the escape of fluid which is blocked or sealed by the main seal, yet the tube or secondary seal acts as a buffer to dampen high peak transient fluid shocks from effectively reaching the main seal.

In my fitting, the tube and sleeve may be repeatedly disconnected from and reconnected to the coupling body. Upon each reconnection, the sleeve reseats itself for sealing purposes as there is a certain amount of small give or yielding to the substantially noncontractible portion and the entrance flare 17. The "hit home" feeling which the operator senses upon the tightening of the nut for the initial installation or for the recoupling installations is definite enough to indicate to the operator to cease attempting to turn the nut on any further.

Figure 4:
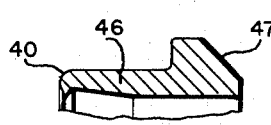
Figure 4 is a fragmentary cross-sectional view of a sleeve which has the segmental fingers removed and which may replace the sleeve of Figures 1 and 2.

In Figure 4, I show a sleeve 46 with the rearwardly extending fingers removed. This sleeve is provided with a cam shoulder 47 against which the cam shoulder 37 of the nut engages. In other particulars, the sleeve 46 is the same as the sleeve 13 of Figures 1 and 2, and may be used interchangeably.

Figure 5:
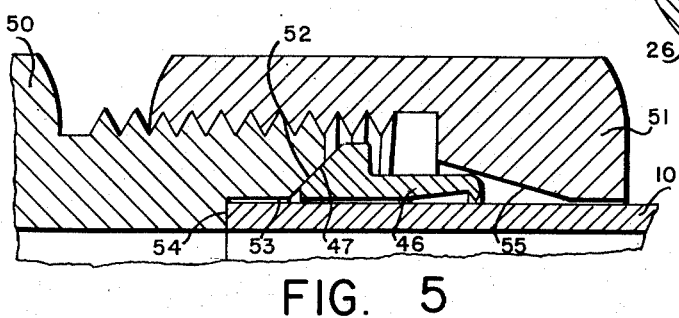
Figure 5 shows the sleeve of Figure 4 used in the reverse order and is adapted to be cammed or deflected into the tube by the nut.

In Figure 5, I show the sleeve 46 used in the reverse order on the tube, in that the leading end 28 of the sleeve is cammed or deflected inwardly against the tube by a tapered annular section 55 of the nut 51. The coupling body 50 is provided with a conical surface 52 against which the tapered shoulder 47 abuts to make a fluid seal. The end of the tube extends into a straight counterbore 53 and abuts against a shoulder 54. In assembly, when the nut 51 is turned on, the camming surface 55 of the nut cams or deflects the leading end 28 of the sleeve against the tube. There is no longitudinal relative movement between the sleeve and the tube as the nut is tightened and thus the sleeve does not shear or "plow up" an appreciable ridge as the rib is embedded in the tube.

The views of the drawings are drawn about four and one-half times actual scale. In actual practice for a ½-inch tube, the radial depth of the internal rib 39 is approximately 15 thousandths of an inch, the maximum wall thickness at the cylindrical wall section 31 is approximately 40 thousandths of an inch, and the minimum wall thickness is approximately 25 thousandths of an inch.

In all the forms of the sleeves shown in the drawing, the continuous annular body is provided at its forward end with a readily contractible portion for gripping the tube and with a substantially noncontractible portion immediately in rear thereof to limit the extent that the gripping portion may grip the tube. Another feature which is common to all of the figures is the fact that the end of the tube wedgingly fits into a slow taper which allows the tube to slightly stick thereinto, whereby during the assembly of the fitting there is assurance that the tube extends beyond the sleeve and into the coupling body when tightening the nut.

The live resiliency and the strength of the forward end of the sleeve prevents it from collapsing each time the nut is tightened, thus enabling the connection to be repeatedly reassembled, and each time the nut is reassembled the rib 30, as well as the recessed wall 35 and the spring fingers 26, takes a new set to give a good sealing action and to absorb vibration. The overcoming of the live resiliency provides the "hit home" feeling to the tightening of the nut.

Although I have described my invention with a certain degree of particularity, it is understood that the present disclosure of the preferred form has been made only by way of example and the numerous changes in the details of construction and the combination and arrangement of parts may be resorted to without departing from the spirit and the scope of the invention as hereinafter claimed.

What is claimed is:

1. A coupling for an insertable member having a substantially cylindrical outer surface, said coupling comprising a body member having a passageway provided with a tapered annular internal surface engageable by the end of the insertable member and an annular internal camming surface at the entrance of the passageway, said tapered surface defining an angle ranging from approximately 2 to 5 degrees with the longitudinal axis of the coupling to wedgingly receive the end of the insertable member and thereby permit relative longitudinal wedging movement between the insertable member and the body member, a sleeve for fitting over said insertable member and having a contractible annular part adapted to fit within the camming surface and be contracted about the insertable member and having means to anchor said sleeve to said insertable member to resist longitudinal movement therebetween, means engaging the body member to force the contractible annular part of said sleeve within said camming surface, said contractible annular part upon being forced into said camming surface contracting about the insertable member to effect a primary seal between the insertable member and the body member, said annular part upon contractibly engaging the insertable member forcing said insertable member wedgingly further into said tapered surface for making a secondary seal between the insertable member and said body member.

2. A coupling for an insertable member having a substantially cylindrical outer surface, said coupling comprising a body member having a passageway provided with a tapered annular internal surface engageable by the end of the insertable member and an annular internal camming surface at the entrance of the passageway, said tapered surface defining an angle ranging from approximately 2 to 5 degrees with the longitudinal axis of the coupling to wedgingly receive the end of the insertable member and thereby permit relative longitudinal wedging movement between the insertable member and the body member, a sleeve for fitting over said insertable member and having a contractible annular part provided on its outer wall with an external cam surface adapted to fit within the internal camming surface of said body member and provided on its inner wall with a substantially V-shaped rib adapted to be contracted about the insertable member, means engaging the body member to force the contractible annular part of said sleeve within said camming surface, said contractible annular part upon being forced into said camming surface contracting about the insertable member, with the rib making its own groove in the insertable member, to effect a primary seal between the insertable member and the body member and to anchor said sleeve to said insertable member to resist longitudinal movement therebetween, said annular part upon contractibly engaging the insertable member forcing said insertable member wedgingly further into said tapered surface for making a secondary seal between the insertable member and said body member, the longitudinal wedging movement of said insertable member into said internal tapered surface relieving said rib of longitudinal thrust as it bites into the insertable member.

GEORGE V. WOODLING.

REFERENCES CITED

The following references are of record in the file of this patent:

UNITED STATES PATENTS

| Number | Name | Date |
| --- | --- | --- |
| 1,755,210 | Dohner | Apr. 22, 1930 |
| 2,351,363 | Parker et al. | June 13, 1944 |
| 2,450,314 | Vandervoort | Sept. 28, 1948 |
| 2,452,890 | Wolfram | Nov. 2, 1948 |
| 2,455,667 | Franck | Dec. 7, 1948 |
| 2,472,872 | Woodling | June 14, 1949 |